United States Patent
Khan et al.

(10) Patent No.: US 8,954,420 B1
(45) Date of Patent: Feb. 10, 2015

(54) METHODS AND SYSTEMS FOR IMPROVING A SEARCH RANKING USING ARTICLE INFORMATION

(75) Inventors: Omar Habib Khan, Toronto (CA); Stephen R. Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 3058 days.

(21) Appl. No.: 10/814,357

(22) Filed: Mar. 31, 2004

Related U.S. Application Data (63) Continuation-in-part of application No. 10/749,620, filed on Dec. 31, 2003, now abandoned, and a continuation-in-part of application No. 10/749,434, filed on Dec. 31, 2003, now abandoned.

(51) Int. Cl.
*G06F 17/30* (2006.01)

(52) U.S. Cl.
USPC .......................................... 707/722; 707/723

(58) Field of Classification Search
USPC .................. 707/7, 3, 5, 9, 722, 723; 713/200
See application file for complete search history.

(56) References Cited

U.S. PATENT DOCUMENTS

| | | | |
|---|---|---|---|
| 4,410,957 A | 10/1983 | Cason et al. |
| 5,280,612 A | 1/1994 | Lorie et al. |
| 5,305,205 A | 4/1994 | Weber |
| 5,321,838 A | 6/1994 | Hensley et al. |
| 5,539,809 A | 7/1996 | Mayer et al. |
| 5,555,346 A | 9/1996 | Grosset et al. |
| 5,566,336 A | 10/1996 | Futatsugi et al. |
| 5,592,378 A | 1/1997 | Cameron et al. |
| 5,623,652 A | 4/1997 | Vora et al. |
| 5,701,469 A | 12/1997 | Brandli et al. |
| 5,742,816 A | 4/1998 | Barr et al. |
| 5,748,954 A | 5/1998 | Mauldin |
| 5,781,192 A | 7/1998 | Kodimer |
| 5,793,948 A | 8/1998 | Asahi et al. |
| 5,819,273 A | 10/1998 | Vora et al. |
| 5,845,300 A | 12/1998 | Comer et al. |
| 5,872,976 A | 2/1999 | Yee et al. |
| 5,881,315 A | 3/1999 | Cohen |
| 5,907,836 A | 5/1999 | Sumita et al. |
| 5,913,208 A | 6/1999 | Brown et al. |
| 5,940,594 A | 8/1999 | Ali et al. |
| 5,956,722 A | 9/1999 | Jacobson |

(Continued)

FOREIGN PATENT DOCUMENTS

| | | |
|---|---|---|
| EP | 1209866 A2 | 5/2002 |
| JP | 2000-099441 | 4/2000 |

(Continued)

OTHER PUBLICATIONS

International Search Report and Written Opinion, PCT/US2004/038562, Apr. 6, 2005.

(Continued)

*Primary Examiner* — Apu Mofiz
*Assistant Examiner* — Fariborz Khoshnoodi
(74) *Attorney, Agent, or Firm* — Finnegan, Henderson, Farabow, Garrett & Dunner, LLP

(57) ABSTRACT

Systems and methods that improve client-side searching are described. In one aspect, a system and method for identifying an article, and determining a ranking score for the article based at least in part on duration data, access data, URL data, or trajectory data associated with the article is described.

54 Claims, 5 Drawing Sheets

(56) References Cited

U.S. PATENT DOCUMENTS

| | | | |
|---|---|---|---|
| 5,961,610 | A | 10/1999 | Kelly et al. |
| 5,964,839 | A | 10/1999 | Johnson et al. |
| 6,006,222 | A | 12/1999 | Culliss |
| 6,014,665 | A | 1/2000 | Culliss |
| 6,025,388 | A | 2/2000 | Liddy et al. |
| 6,029,195 | A | 2/2000 | Herz |
| 6,055,579 | A | 4/2000 | Goyal et al. |
| 6,073,130 | A | 6/2000 | Jacobson et al. |
| 6,078,916 | A | 6/2000 | Culliss |
| 6,092,101 | A | 7/2000 | Birrell et al. |
| 6,115,802 | A | 9/2000 | Tock |
| 6,119,147 | A | 9/2000 | Toomey et al. |
| 6,175,830 | B1 | 1/2001 | Maynard |
| 6,182,065 | B1 | 1/2001 | Yeomans |
| 6,182,068 | B1 | 1/2001 | Culliss |
| 6,184,880 | B1 | 2/2001 | Okada |
| 6,188,277 | B1 | 2/2001 | Borodulin et al. |
| 6,199,067 | B1 | 3/2001 | Geller |
| 6,202,065 | B1 | 3/2001 | Wills |
| 6,209,000 | B1 | 3/2001 | Klein et al. |
| 6,226,630 | B1 | 5/2001 | Bilmers |
| 6,236,768 | B1 | 5/2001 | Rhodes et al. |
| 6,236,978 | B1 | 5/2001 | Tuzhilin |
| 6,240,548 | B1 | 5/2001 | Holzle et al. |
| 6,269,369 | B1 | 7/2001 | Robertson |
| 6,275,820 | B1 | 8/2001 | Navin-Chandra et al. |
| 6,275,957 | B1 | 8/2001 | Novik et al. |
| 6,282,548 | B1 | 8/2001 | Burner et al. |
| 6,321,228 | B1 | 11/2001 | Crandall et al. |
| 6,330,589 | B1 | 12/2001 | Kennedy |
| 6,341,371 | B1 | 1/2002 | Tandri |
| 6,346,952 | B1 | 2/2002 | Shtivelman |
| 6,347,374 | B1 | 2/2002 | Drake et al. |
| 6,349,299 | B1 | 2/2002 | Spencer et al. |
| 6,363,373 | B1 | 3/2002 | Steinkraus |
| 6,380,924 | B1 | 4/2002 | Yee et al. |
| 6,393,421 | B1 | 5/2002 | Paglin |
| 6,393,438 | B1 | 5/2002 | Kathrow et al. |
| 6,401,239 | B1 | 6/2002 | Miron |
| 6,446,076 | B1 | 9/2002 | Burkey et al. |
| 6,477,585 | B1 | 11/2002 | Cohen et al. |
| 6,480,837 | B1 | 11/2002 | Dutta |
| 6,487,555 | B1 | 11/2002 | Bharat |
| 6,490,577 | B1 | 12/2002 | Anwar |
| 6,513,036 | B2 | 1/2003 | Fruensgaard et al. |
| 6,526,405 | B1 | 2/2003 | Mannila et al. |
| 6,532,023 | B1 | 3/2003 | Schumacher et al. |
| 6,560,655 | B1 | 5/2003 | Grambihler et al. |
| 6,564,213 | B1 | 5/2003 | Ortega et al. |
| 6,581,056 | B1 | 6/2003 | Rao |
| 6,592,627 | B1 | 7/2003 | Agrawal et al. |
| 6,604,236 | B1 | 8/2003 | Draper et al. |
| 6,631,345 | B1 | 10/2003 | Schumacher et al. |
| 6,658,423 | B1 | 12/2003 | Pugh et al. |
| 6,662,226 | B1 | 12/2003 | Wang et al. |
| 6,681,247 | B1 | 1/2004 | Payton |
| 6,684,250 | B2 | 1/2004 | Anderson et al. |
| 6,691,175 | B1 | 2/2004 | Lodrige et al. |
| 6,694,353 | B2 | 2/2004 | Sommerer |
| 6,697,838 | B1 | 2/2004 | Jakobson |
| 6,707,471 | B2 | 3/2004 | Funaki |
| 6,708,293 | B2 | 3/2004 | Kaler et al. |
| 6,728,763 | B1 | 4/2004 | Chen |
| 6,772,143 | B2 | 8/2004 | Hung |
| 6,779,030 | B1 | 8/2004 | Dugan et al. |
| 6,782,381 | B2 | 8/2004 | Nelson et al. |
| 6,820,075 | B2 | 11/2004 | Shanahan et al. |
| 6,826,553 | B1 | 11/2004 | DaCosta et al. |
| 6,850,934 | B2 | 2/2005 | Bates et al. |
| 6,853,950 | B1 | 2/2005 | O'Reilly et al. |
| 6,864,901 | B2 | 3/2005 | Chang et al. |
| 6,865,715 | B2 | 3/2005 | Uchino et al. |
| 6,873,982 | B1 | 3/2005 | Bates et al. |
| 6,877,027 | B1 | 4/2005 | Spencer et al. |
| 6,879,691 | B1 | 4/2005 | Koretz |
| 6,901,378 | B1 | 5/2005 | Linker et al. |
| 6,907,577 | B2 | 6/2005 | Tervo |
| 6,934,740 | B1 | 8/2005 | Lawande et al. |
| 6,957,229 | B1 | 10/2005 | Dyor |
| 6,963,830 | B1 | 11/2005 | Nakao |
| 6,968,509 | B1 | 11/2005 | Chang et al. |
| 6,981,040 | B1 | 12/2005 | Konig et al. |
| 6,983,310 | B2 | 1/2006 | Rouse et al. |
| 6,985,913 | B2 | 1/2006 | Murata |
| 6,999,957 | B1 | 2/2006 | Zamir et al. |
| 7,016,919 | B2 | 3/2006 | Cotton et al. |
| 7,080,073 | B1 | 7/2006 | Jiang et al. |
| 7,096,255 | B2 | 8/2006 | Malik |
| 7,099,887 | B2 | 8/2006 | Hoth et al. |
| RE39,326 | E | 10/2006 | Comer et al. |
| 7,162,473 | B2 | 1/2007 | Dumais et al. |
| 7,181,438 | B1 | 2/2007 | Szabo |
| 7,188,316 | B2 | 3/2007 | Gusmorino et al. |
| 7,200,802 | B2 | 4/2007 | Kawatani |
| 7,219,184 | B2 | 5/2007 | Stojancic |
| 7,233,948 | B1 | 6/2007 | Shamoon et al. |
| 7,240,049 | B2 | 7/2007 | Kapur |
| 7,245,910 | B2 | 7/2007 | Osmo |
| 7,249,158 | B2 | 7/2007 | Naitou |
| 7,257,822 | B1 | 8/2007 | Sambhus et al. |
| 7,265,858 | B2 | 9/2007 | Park et al. |
| 7,328,242 | B1 | 2/2008 | McCarthy et al. |
| 7,330,536 | B2 | 2/2008 | Claudatos et al. |
| 7,337,448 | B1 | 2/2008 | Dalia et al. |
| 7,343,365 | B2 | 3/2008 | Farnham et al. |
| 7,346,613 | B2 | 3/2008 | Hurst-Hiller et al. |
| 7,370,035 | B2 | 5/2008 | Gross et al. |
| 7,376,640 | B1 | 5/2008 | Anderson et al. |
| 7,383,307 | B2 | 6/2008 | Kirkland et al. |
| 7,412,491 | B2 | 8/2008 | Gusler et al. |
| 7,437,444 | B2 | 10/2008 | Houri |
| 7,441,246 | B2 | 10/2008 | Auerbach et al. |
| 7,457,872 | B2 | 11/2008 | Aton et al. |
| 7,467,390 | B2 | 12/2008 | Gilgen et al. |
| 7,475,406 | B2 | 1/2009 | Banatwala et al. |
| 7,499,974 | B2 | 3/2009 | Karstens |
| 7,500,249 | B2 | 3/2009 | Kampe et al. |
| 7,516,118 | B1 | 4/2009 | Badros et al. |
| 7,546,602 | B2 | 6/2009 | Hejlsberg et al. |
| 7,562,367 | B1 | 7/2009 | Arad |
| 7,577,667 | B2 | 8/2009 | Hinshaw et al. |
| 7,602,382 | B2 | 10/2009 | Hinckley et al. |
| 7,634,546 | B1 | 12/2009 | Strickholm et al. |
| 7,650,403 | B2 | 1/2010 | Koetke et al. |
| 7,676,553 | B1 | 3/2010 | Laucius et al. |
| 7,941,439 | B1 | 5/2011 | Lawrence et al. |
| 8,099,407 | B2 | 1/2012 | Auerbach et al. |
| 8,386,728 | B1 | 2/2013 | Ionescu et al. |
| 2001/0002469 | A1 | 5/2001 | Bates et al. |
| 2001/0016852 | A1 | 8/2001 | Peairs et al. |
| 2001/0049677 | A1 | 12/2001 | Talib et al. |
| 2002/0042789 | A1 | 4/2002 | Michalewicz et al. |
| 2002/0049608 | A1 | 4/2002 | Hartsell et al. |
| 2002/0055844 | A1 | 5/2002 | L'Esperance et al. |
| 2002/0056089 | A1 | 5/2002 | Houston |
| 2002/0059245 | A1 | 5/2002 | Zakharov et al. |
| 2002/0059265 | A1 | 5/2002 | Valorose, III |
| 2002/0059425 | A1 | 5/2002 | Belfiore et al. |
| 2002/0065802 | A1 | 5/2002 | Uchiyama |
| 2002/0073076 | A1 | 6/2002 | Xu et al. |
| 2002/0078256 | A1 | 6/2002 | Gehman et al. |
| 2002/0087507 | A1 | 7/2002 | Hopewell et al. |
| 2002/0091568 | A1 | 7/2002 | Kraft et al. |
| 2002/0091972 | A1 | 7/2002 | Harris et al. |
| 2002/0103664 | A1 | 8/2002 | Olsson et al. |
| 2002/0116291 | A1 | 8/2002 | Grasso et al. |
| 2002/0138467 | A1 | 9/2002 | Jacobson et al. |
| 2002/0156760 | A1 | 10/2002 | Lawrence et al. |
| 2002/0165903 | A1 | 11/2002 | Zargham et al. |
| 2002/0174101 | A1 | 11/2002 | Fernley et al. |
| 2002/0178383 | A1 | 11/2002 | Hrabik et al. |
| 2002/0184224 | A1 | 12/2002 | Haff et al. |
| 2002/0184406 | A1 | 12/2002 | Aliffi |
| 2002/0194046 | A1 | 12/2002 | Sullivan et al. |

(56) References Cited

U.S. PATENT DOCUMENTS

| | | |
|---|---|---|
| 2003/0001854 A1 | 1/2003 | Jade et al. |
| 2003/0018521 A1 | 1/2003 | Kraft et al. |
| 2003/0023586 A1 | 1/2003 | Knorr |
| 2003/0028506 A1 | 2/2003 | Yu |
| 2003/0028896 A1 | 2/2003 | Swart et al. |
| 2003/0036848 A1 | 2/2003 | Sheha et al. |
| 2003/0036914 A1 | 2/2003 | Fitzpatrick |
| 2003/0041112 A1 | 2/2003 | Tada et al. |
| 2003/0050909 A1 | 3/2003 | Preda et al. |
| 2003/0050966 A1 | 3/2003 | Dutta et al. |
| 2003/0055816 A1 | 3/2003 | Paine et al. |
| 2003/0055828 A1 | 3/2003 | Koch et al. |
| 2003/0083947 A1 | 5/2003 | Hoffman et al. |
| 2003/0088433 A1 | 5/2003 | Young et al. |
| 2003/0097361 A1 | 5/2003 | Huang et al. |
| 2003/0123442 A1 | 7/2003 | Drucker et al. |
| 2003/0123443 A1 | 7/2003 | Anwar |
| 2003/0126136 A1 | 7/2003 | Omoigui |
| 2003/0130984 A1 | 7/2003 | Quinlan et al. |
| 2003/0131000 A1 | 7/2003 | Bates et al. |
| 2003/0131061 A1 | 7/2003 | Newton et al. |
| 2003/0149694 A1 | 8/2003 | Ma et al. |
| 2003/0154071 A1 | 8/2003 | Shreve |
| 2003/0154293 A1 | 8/2003 | Zmolek |
| 2003/0167266 A1 | 9/2003 | Saldanha et al. |
| 2003/0182480 A1 | 9/2003 | Varma et al. |
| 2003/0185379 A1 | 10/2003 | O'Connor et al. |
| 2003/0187837 A1* | 10/2003 | Culliss ............... 707/3 |
| 2003/0191626 A1 | 10/2003 | Al-Onaizan et al. |
| 2003/0212654 A1 | 11/2003 | Harper et al. |
| 2003/0233366 A1 | 12/2003 | Kesselman et al. |
| 2003/0233419 A1 | 12/2003 | Beringer |
| 2004/0002959 A1 | 1/2004 | Alpert et al. |
| 2004/0003038 A1 | 1/2004 | Huang et al. |
| 2004/0031027 A1 | 2/2004 | Hiltgen |
| 2004/0044962 A1 | 3/2004 | Green et al. |
| 2004/0054737 A1 | 3/2004 | Daniell |
| 2004/0064447 A1 | 4/2004 | Simske et al. |
| 2004/0078355 A1 | 4/2004 | Suresh |
| 2004/0088285 A1 | 5/2004 | Martin et al. |
| 2004/0093317 A1 | 5/2004 | Swan |
| 2004/0095852 A1 | 5/2004 | Griner et al. |
| 2004/0098609 A1* | 5/2004 | Bracewell et al. ............ 713/200 |
| 2004/0103409 A1 | 5/2004 | Hayner et al. |
| 2004/0128285 A1 | 7/2004 | Green et al. |
| 2004/0133560 A1 | 7/2004 | Simske |
| 2004/0133561 A1 | 7/2004 | Burke |
| 2004/0141594 A1 | 7/2004 | Brunson et al. |
| 2004/0143569 A1 | 7/2004 | Gross et al. |
| 2004/0153444 A1 | 8/2004 | Senders et al. |
| 2004/0155910 A1 | 8/2004 | Chang et al. |
| 2004/0168150 A1 | 8/2004 | Ziv |
| 2004/0186848 A1 | 9/2004 | Kobashikawa et al. |
| 2004/0186896 A1 | 9/2004 | Daniell et al. |
| 2004/0187075 A1 | 9/2004 | Maxham et al. |
| 2004/0193596 A1 | 9/2004 | Defelice et al. |
| 2004/0203642 A1 | 10/2004 | Zatloukal et al. |
| 2004/0205773 A1 | 10/2004 | Carcido et al. |
| 2004/0215715 A1 | 10/2004 | Ehrich et al. |
| 2004/0230572 A1 | 11/2004 | Omoigui |
| 2004/0235520 A1 | 11/2004 | Cadiz et al. |
| 2004/0254938 A1 | 12/2004 | Marcjan et al. |
| 2004/0255301 A1 | 12/2004 | Turski et al. |
| 2004/0261026 A1 | 12/2004 | Corson |
| 2004/0267700 A1 | 12/2004 | Dumais et al. |
| 2004/0267756 A1 | 12/2004 | Bayardo et al. |
| 2005/0021542 A1 | 1/2005 | Irle et al. |
| 2005/0033803 A1 | 2/2005 | Vleet et al. |
| 2005/0050547 A1 | 3/2005 | Whittle et al. |
| 2005/0057584 A1 | 3/2005 | Gruen et al. |
| 2005/0060310 A1* | 3/2005 | Tong et al. ............... 707/7 |
| 2005/0060719 A1 | 3/2005 | Gray et al. |
| 2005/0071255 A1 | 3/2005 | Wang et al. |
| 2005/0076115 A1 | 4/2005 | Andrews et al. |
| 2005/0080792 A1 | 4/2005 | Ghatare |
| 2005/0080866 A1 | 4/2005 | Kent, Jr. et al. |
| 2005/0108213 A1 | 5/2005 | Riise et al. |
| 2005/0108332 A1 | 5/2005 | Vaschillo et al. |
| 2005/0114021 A1 | 5/2005 | Krull et al. |
| 2005/0114487 A1 | 5/2005 | Peng et al. |
| 2005/0165777 A1 | 7/2005 | Hurst-Hiller et al. |
| 2005/0192921 A1 | 9/2005 | Chaudhuri et al. |
| 2005/0216482 A1 | 9/2005 | Ponessa |
| 2005/0251526 A1 | 11/2005 | Nayak |
| 2005/0262073 A1 | 11/2005 | Reed et al. |
| 2006/0031365 A1 | 2/2006 | Kay et al. |
| 2006/0036548 A1 | 2/2006 | Roever et al. |
| 2006/0085750 A1 | 4/2006 | Easton et al. |
| 2006/0100912 A1 | 5/2006 | Kumar et al. |
| 2006/0106778 A1 | 5/2006 | Baldwin |
| 2006/0167704 A1 | 7/2006 | Nicholls et al. |
| 2006/0190470 A1 | 8/2006 | Lemnotis |
| 2006/0224553 A1 | 10/2006 | Chtcherbatchenko et al. |
| 2006/0288075 A1 | 12/2006 | Wu |
| 2007/0016556 A1 | 1/2007 | Ann et al. |
| 2007/0022102 A1 | 1/2007 | Saxena |
| 2007/0022155 A1 | 1/2007 | Owens et al. |
| 2007/0033275 A1 | 2/2007 | Toivonen et al. |
| 2007/0055689 A1 | 3/2007 | Rhoads et al. |
| 2007/0078860 A1 | 4/2007 | Enenkiel |
| 2007/0208697 A1 | 9/2007 | Subramaniam et al. |

FOREIGN PATENT DOCUMENTS

| | | |
|---|---|---|
| JP | 2001-5705 | 1/2001 |
| JP | 2003-242176 | 8/2003 |
| JP | 2003-296365 | 10/2003 |
| JP | 2004-062451 | 2/2004 |
| RU | 2138076 C1 | 9/1999 |
| WO | WO 01/62004 A2 | 8/2001 |
| WO | WO 02/069118 | 9/2002 |
| WO | WO 2005/006129 A2 | 1/2005 |

OTHER PUBLICATIONS

Knezevic, P. et al., "The Architecture of The Obelix—An Improved Internet Search Engine," Proceedings of the 33$^{rd}$ Annual Hawaii International Conference on System Sciences (HICSS) Jan. 4-7, 2000, Maui, HI, USA, pp. 2145-2155.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

U.S. Appl. No. 10/749,440, Dec. 31, 2003, Badros et al.

80-20 Software—Products—80-20 One Search, http://www.80-20.com/products/one-search/retriever.asp, printed Mar. 16, 2004.

"askSam™ Making Information Useful," askSam,—Organize your information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web." IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J., et al.. "A Machine Learning Architecture for Optimizing Web Search Engines," School of Computer Science, Carnegie Mellon University, May 10, 1996. pp. 1-8.

Bradenbaugh, F., "Chapter 1 The Client-Side Search Engine," *JavaSctipt Cookbook*, 1$^{st}$ Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., 'User Interactions with Everyday Applications as Context for Just-in-time Information Access, Intelligent Information Laboratory, Northwestern University, pp. 1-8, no date.

(56) References Cited

OTHER PUBLICATIONS

DEVONthink, http://www.devon-techonologies.com/products/devonthink.php, printed Mar. 16, 2004.
dtSearch®—http://www.dtsearch.com/, printed Mar. 15, 2004.
Dumais, S., et al, "Stuff I've Seen: A System for Personal Information Retrieval and Re-Use," Microsoft Research, *SIGIR '03*, Jul. 28-Aug. 1, 2003, pp. 1-8.
Enfish, http://www.enfish.com, printed Mar. 16, 2004.
Fast Search & Transfer—Home—Enterprise Search, http://solutions.altavista.com/en/news/pr_020402_desktop.shtmu, printed Mar. 16, 2004.
Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.
Geisler, G., "Enriched Links: A Framework for Improving Web Navigation Using Pop-Up Views," pp. 1-14, 2000.
ISYS Search Software—ISYS: desktop, http://www.isysusa.com/products/desktop/index.html, printed Mar. 16, 2004.
Joachims. T., at al., "WebWatcher: A Tour Guide for the World Wide Web," 1996.
Markoff, J., "Google Moves Toward Clash with Microsoft," *The New York Times*, May 19, 2004, http://www.nytimes.com/2004/5/19/technology/19google.html?ex=1085964389&ei=1&e . . . , pp. 1-4, printed May 19, 2004.
Naraine, R., "Future of Search Will Make You Dizzy," Enterprise, May 20, 2004, http://www.internetnews.com/ent-news/article.php/3356831, pp. 1-4, printed May 21, 2004.
"Overview," Stuff I've Seen—Home Page, http://research.Microsoft.com/adapt/sis/index.htm, pp. 1-2, printed May 26, 2004.
Rhodes, B., "Margin Notes Building a Contextually Aware Associative Memory," *The Proceedings of the International Conference on Intelligent User Interfaces (IUI'00)*, Jan. 9-12, 2000.
Rhodes, B., at al., "Just-in-time information retrieval agents," *Systems Journal*, vol. 39, Nos. 3&4, 2000, pp. 685-704.
Rhodes, B., et al., "Remembrance Agent—A continuously running automated information retrieval system," *The Proceedings of the First International Conference on the Practical Application of Intelligent Agents and Multi Agent Technology* (PAAM '96), pp. 487-495.
Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm . . . , pp. 1-5, printed Apr. 21, 2004.
"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.
"Selecting Task-Relevant Sources for Just-In-Time Retrieval," pp. 1-3, no date.
Sherman, C., "HotBot's New Desktop Search Toolbar," www.searchenginewatch.com, http://searchenginewatch.com/searchday/print.php/34711_339921, pp. 1-3, printed Apr. 14, 2004.
"Standardization Priorities for the Directory—Directory Interoperability Forum White Paper," The Open Group, Dec. 2001, pp. 1-21.
Sullivan, D., "Alta Vista Releases Search Software," *The Search Engine Report*, Aug. 4, 1998, pp. 1-2.
WebWatcher Home Page, "Welcome to the WebWatcher Project," http://www-2.cs.cmu.edu/~webwatcher/, printed Oct. 15, 2003.
"WhenU Just-In-Time Marketing," http://www.whenu.com, printed Mar. 19, 2004.
X1 instantly searches files & email. For outlook, Outlook, http://www.x1.com/, printed Mar. 15, 2004.
Zellweger, P., et al., "Fluid Links for Informed and Incremental Link Transitions," Proceedings of Hypertext'98, Pittsburgh, PA, Jun. 20-24, 1998, pp. 50-57.
U.S. Appl. No. 10/814,773, filed Mar. 31, 2004, Lawrence et al.
"About Spector CNE," Spectorsoft, 1 page, [online] [Retrieved on May 23, 2007] Retrieved from the Internet: URL: http://www.spectorsoft.com/products/spectorcne_windows/help/v40/webhelp/About_Spector_CNE>.
"Spector Corporate Network Edition 4.0 (Spector CNE) Online User Manual," SpectorSoft Corporation, 2003, [online] [retrieved on May 12, 2005] Retrieved from the Internet: <URL: http://www.spectorsoft.com/products/spectorcne_windows/help/v40/webhelp/>.
International Preliminary Report on Patentabiity, PCT/US2005/003386, Jun. 24, 2005, 8 pages.
International Search Report and Written Opinion, PCT/US2005/003386, Jun. 28, 2005.
International Search Report and Written Opinion, PCT/US2005/010985, Apr. 26, 2007, 9 pages.
Bengel, J., et al., "Archiving and Indexing Chat Utterances," Electrical Engineering and Computer-Science and Information Technology Telecommunications Center University of Kansas, 2003.
Huang, Q., et al., Multimedia Search and Retrieval: New Concepts, System Implementation, and Application, Circuits and Systems for Video Technology, IEEE Transaction s on Circuits and Systems for Video Technology, Aug. 2000, pp. 679-692, vol. 10. Issue 5.
Pingali, G. S., et al., "Instantly Indexed Multimedia Databases of Real World Events," IEEE Transactions on Multimedia, Jun. 2002, pp. 269-282, vol. 4, Issue 2.
Sengupta, S., et al., Designing a Value Based Niche Search Engine Using Evolutionary Strategies, Proceedings of the International Conference of Information Technology: Coding and Computing (ITCC'05), IEEE, 2005, Pennsylvania State University.
PCT International Search Report and Written Opinion, PCT/US05/10687, Sep. 10, 2008, 14 Pages.
PCT International Search Report and Written Opinion, PCT/US05/10685, Jul. 3, 2008, 11 Pages.
Examination Report, European Patent Application No. 05731427.0, Jul. 28, 2008, 5 Pages.
European Examination Report, European Application No. EP 05731490.8, Jul. 7, 2008, 5 pages.
European Search Report, European Application No. EP 05731490.8, Apr. 28, 2008, 4 pages.
Bacon, J. et al., "Event Storage and Federation Using ODMG," 2000, pp. 265-281, vol. 2135, [online] Retrieved from the Internet<URL: http://citeseer.ist.psu.edu/bacon00event.html>.
Spiteri, M.D. et al., "An Architecture to Support Storage and Retrieval of Events," Sep. 1998, pp. 443-458, [online] Retrieved from the Internet<URL:http://citeseer.ist.psu.edu/spiteri98architecture.html>.
Spiteri, M.D., "An Architecture for the Notification, Storage and Retrieval of Events," Jan. 2000, pp. 1-165 pages, [online] Retrieved from the Internet<URL:http://citeseer.ist.psu.edu/spiteri00architecture.html>.
Jonathan Bennett & AutoIt Team, "AutoIt v3 Homepage," Verson v3.0.102, 1999-2004, 26 pages, [online] [Archived on Aug. 13, 2004; Retrieved on Dec. 2, 2008] Retrieved from the internet <URL:http://web.archive.org/web/20040813195143/http://www.autoitscript.com/autoit3/docs/>.
Budzik, J., "Information access in context," Knowledge-Based Systems, Elsevier 2001, pp. 37-53, vol. 14.
Gemmell, J., et al., "Living with a Lifetime Store," Proc. ATR Workshop on Ubiquitous Experience Media, Sep. 9-10, 2003, pp. 69-76.
Gemmell, J., et al., "The MyLifeBits Lifetime Store," Proceedings of the 2003 ACM SIGMM Workshop on Experimental Telepresence, Nov. 7, 2003, pp. 80-83.
Rekimoto, J., "Time-Machine Computing: A Time-centric Approach for the Information Environment," Proceedings of the Annual ACM Symposium on User Interface Software and Technology, Nov. 7, 1999, pp. 1-10.
Response to the Summons to attend oral proceedings dated Sep. 20, 2011, filed Nov. 14, 2011, for European Patent Application No. EP 04811317.9, 6 pages.
Extended European Search Report for European Patent Application No. EP 11181522, Oct. 28, 2011, 10 pages.
Summons to Attend Oral Proceedings Pursuant to Rule 115(1) EPC, mailed on Sep. 20, 2011, European Patent Application No. EP 04811317.9, 9 pages.
Office Action mailed Sep. 6, 2011, for U.S. Appl. No. 10/814,999, 38 pages.

(56) References Cited

OTHER PUBLICATIONS

Communication Pursuant to Article 94(3) EPC, European Patent Application No. EP 04811317.9, Sep. 7, 2009, 5 pages.
First Examination Report for India Patent Application No.: 1515/KOLNP/2006, Jun. 22, 2010, 2 pages.
Second Examination Report for India Patent Application No.: 1515/KOLNP/2006, Jun. 2, 2011, 1 page.
Notice of Grounds for Rejection for Japanese Patent Application No. P2006-547002, Jun. 4, 2010, 6 pages.
Official Action for Russian Patent Application No. 2006127461/(029833), Sep. 10, 2007, 14 pages.

* cited by examiner

METHODS AND SYSTEMS FOR IMPROVING A SEARCH RANKING USING ARTICLE INFORMATION

RELATED APPLICATIONS

This application is a continuation in part to application Ser. No. 10/749,620 filed Dec. 31, 2003, titled "Methods and Systems for Improving a Ranking by Propagating a Ranking Score Based in Part on Client-Side Behavior Data" now abandoned and to application Ser. No. 10/749,434 filed Dec. 31, 2003, titled "Methods and Systems for Improving a Search Ranking Using Article Information" now abandoned the entirety of which are incorporated herein by reference.

FIELD OF THE INVENTION

The invention generally relates to search engines. More particularly, the invention relates to methods and systems for improving a search ranking using article information such as client-side information.

BACKGROUND

Search engines are useful for locating a specific desired or relevant article from a large collection of articles. Conventional search engines often sort articles of a search result based on the contents of the articles, such as on the number of times a keyword or particular word or phrase appears in each article.

Conventional client-side applications return results based, for example, on certain article attributes or history data. For example, existing client-side search applications provide search results listed by the date and time the article was last saved, the type of article, or the size of the article. The user can restrict the search by entering other parameters such as last edit time, other words or phrases in the article, or article type. Nonetheless, the relatively limited article attributes and history data used by conventional client-side search applications may degrade user experience.

Thus, what is desirable is a method and system that overcomes one or more drawbacks associated with prior client-side search applications.

SUMMARY

Embodiments of the present invention comprise systems and methods that improve searching. One aspect of one embodiment of the present invention comprises determining a ranking score for an article based at least in part on duration data, access data, URL data, or trajectory data associated with the article.

This exemplary embodiment is mentioned not to limit or define the invention, but to provide one example of an embodiment of the invention to aid understanding thereof. Exemplary embodiments are discussed in the Detailed Description, and further description of the invention is provided there. Advantages offered by the various embodiments of the present invention can be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
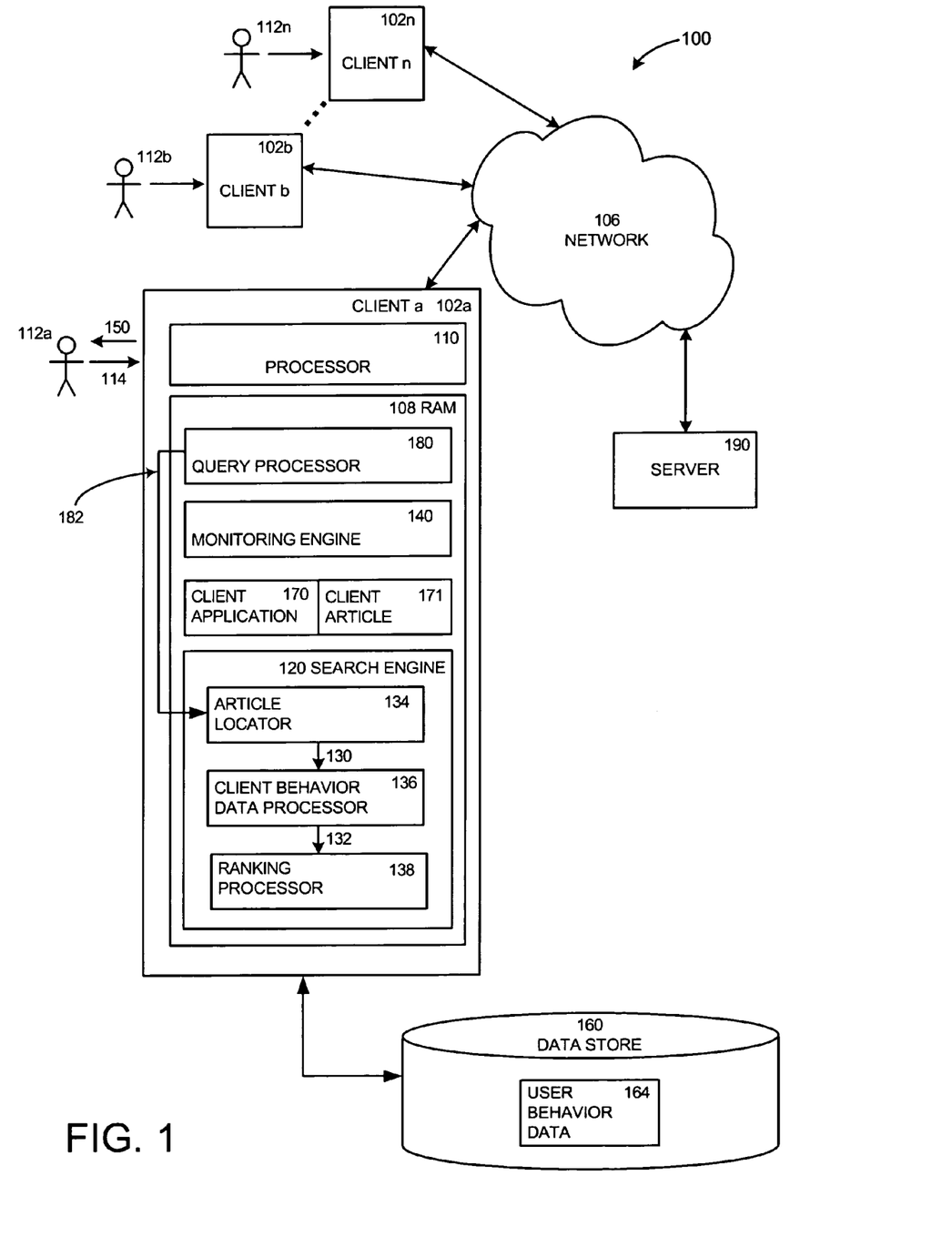
FIG. 1 illustrates a block diagram of a system in accordance with one embodiment of the present invention.

The present invention comprises methods and systems for improving a search ranking using article information. Various systems in accordance with the present invention can be constructed. FIG. 1 is a diagram illustrating an exemplary system in which exemplary embodiments of the present invention may operate. The present invention may operate, and be embodied in, other systems as well.

The system 100 shown in FIG. 1 comprises multiple client devices 102a-n, users 112a-n, a network 106, and a server 190. The network 106 shown comprises the Internet. In other embodiments, other networks, such as an intranet, LAN or WAN may be used. The client devices 102a-n shown each comprise a computer-readable medium, such as a random access memory (RAM) 108 coupled to a processor 110. The processor 110 executes a set of computer-executable program instructions stored in memory 108. Such processors may comprise a microprocessor, an ASIC, and state machines. Such processors comprise, or communicate with, media, for example computer-readable media, which stores instructions that, when executed by the processor, cause the processor to perform the methods described herein.

Embodiments of computer-readable media comprise, but are not limited to, an electronic, optical, magnetic, or other storage or transmission device capable of providing a processor with computer-readable instructions. Other examples of suitable media comprise, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, HTML, Java, and JavaScript.

Client devices 102a-n may also comprise a number of external or internal devices such as a mouse, a CD-ROM, a keyboard, voice recognition hardware, a display, or other input or output devices. Examples of client devices 102a-n are personal computers, digital assistants, personal digital assistants, cellular phones, mobile phones, smart phones, pagers, digital tablets, laptop computers, wearable computers, a processor-based device, and similar types of systems and devices. In general, a client device 102a-n may be any type of processor-based platform that interacts with one or more application programs. The client devices in 102a-n shown in FIG. 1 comprise personal computers.

The memory 108 comprises a monitoring engine 140, a client application 170, a client article 171, and a query processor 180. Articles may comprise documents, for example, web pages of various formats, such as HTML, XML, XHTML, Portable Document Format (PDF) files, and word processor, database, and application program document files, chat messages, email messages, audio, video, or any other information of any type whatsoever made available on a network (such as the Internet), a personal computer, or other computing or storage means. Articles can comprise client-side articles and network articles. Client-side articles can include, for example, articles that are stored or manipulated primarily on a client-side device such as, for example, word processing documents, emails, data spreadsheets, database documents, media files or other articles. Network articles can comprise, for example, articles stored or accessed previously from the network 106 such as, for example, web pages. The client article 171 comprises any article associated with the user or client device. In the embodiment shown, the client application 170 comprises an Internet browser application, and the client article 171 comprises a document in a format usable with the Internet browser application.

The monitoring engine 140 shown determines client-side behavior data associated with the client application 170. The client-side behavior data may comprise, for example, duration data, access data, URL data, trajectory data, as well as other forms of client-side behavior data. Duration data can include, for example, an amount of time the user 112*a* spends on an article, such as a web page. Additionally, duration data can include an amount of time the user 112*a* spends on an article, such as a web page hosted by another web page. For example, the amount of time a user spends on www.google.com/search/images.html can be attributed, in part, to time on the host www.google.com. Access data can include, for example, the number of times the user 112*a* views an article or otherwise opens and enters into or interacts with an article. Additionally, access data can include a total number of days on which a document is accessed or edited by a user 112*a* or a frequency of article access. URL data can include, for example, the method in which a user 112*a* accesses a particular URL. For example, URL data can include whether a user types a URL into an address field of a web browser or whether a user accesses a URL by clicking on a hyperlink to another web page or a hyperlink in an email message, for example. Trajectory data can include a sequence of articles accessed by the user 112*a* including, for example, which article initiates a sequence of articles and which article terminates a sequence of articles. For example, trajectory data can include data identifying a login page as initiating a sequence of web pages and a logout page as terminating a sequence of web pages viewed by the user 112*a*. Each of these types of data will be discussed more fully below.

The monitoring engine 140 monitors the user's interactions and the client computer's interactions with articles on the client computer. In other embodiments, the monitoring engine 140 monitors multiple users' interactions with articles, on the client computer, on an associated network, or elsewhere. As one example, the monitoring engine 140 can monitor the client article 171 and detect that the user 112*a* is typing a URL on the client article 171 using the client application 170. The monitoring engine 140 can monitor and record the URL input. The monitoring engine 140 can also monitor and record interactions with multiple articles (not shown here) on client 102*a*. The gathering and use of client-side behavior data is described further below.

The monitoring engine 140, according to the illustrated embodiment, stores the gathered client-side behavior data in a data store 160. The data store can be one or more logical or physical storage areas. The data store 160 in the illustrated embodiment comprises a client behavior data database 164. According to other aspects or embodiments of the present invention, the data store 160 can comprise a pre-existing database. Data storage elements of the data store 160 can comprise any one or combination of methods for storing data, including without limitation, arrays, hashtables, lists, and pairs. Other similar types of data storage devices can be accessed by the client device 102. The client behavior data database 164 stores data associated with the client application 170 and client-side behavior data, such as duration data, access data, URL data, trajectory data, or other forms of client-side behavior data. The client behavior data can be combined with other data in a single database, or can be stored in multiple databases.

The query processor 180 comprises software and hardware that enable the query processor 180 to receive either an explicit search query 114 entered by the user 112*a* or generate an implicit query based on client-side behavior data. The query processor 180 then formats the implicit or explicit query into a query signal 182 that can be received by a search engine 120. The memory 108 further comprises the search engine 120. The search engine 120 locates relevant information in response to the query signal 182 from the query processor 180. The query signal 182 can correspond, for example, to an explicit query signal generated based on the search query entered by a user 112*a*, or an implicit query signal generated based on event signals from the monitoring engine 140. The search engine 120 responds to the query signal 182 by returning a set of relevant information or a search result 150 to the user 112*a*.

The search engine 120 shown comprises an article locator 134, a ranking processor 138, and a client behavior data processor 136. In the embodiment shown, each comprises computer code residing in the memory 108. The article locator 134 identifies a set of relevant articles relevant to the query signal 182 from the query processor 180. The client behavior data processor 136 retrieves from the data store 160, or otherwise determines, client-side behavior data associated with articles in the set of relevant articles returned by the article locator 134. The ranking processor 138 ranks or scores each article in the set of relevant articles identified by the article locator 134 based at least in part on the client-side behavior data determined by the client behavior data processor 136. Note that other functions and characteristics of the article locator 134, ranking processor 138, and user data processor 138 are further described below.

Figure 2:
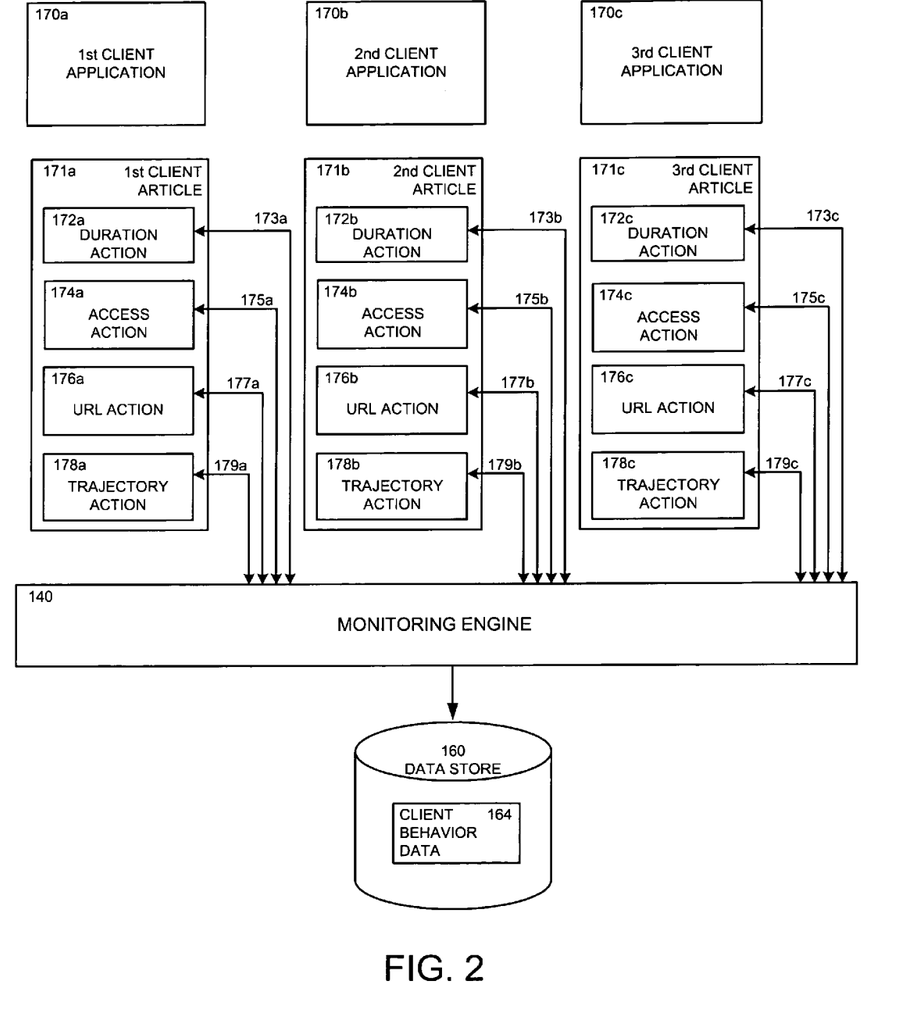
FIG. 2 illustrates a detailed view of a portion of the system illustrated in FIG. 1 in accordance with one embodiment of the present invention.

FIG. 2 shows a more detailed view of the monitoring engine 140 shown in FIG. 1. As the client 102*a* or the user 112*a* interacts with a client articles 171*a-c*, the monitoring engine 140 monitors such client behavior activity, and from this client behavior activity creates client-side behavior data including duration data 173*a-c*, access data 175*a-c*, URL data 177*a-c*, and trajectory data 179*a-c* associated with the client articles 171*a-c*. The client behavior activity associated with the client articles 171*a-c*, according to the embodiment illustrated, comprises one or more of duration action 172*a-c*, access action 174*a-c*, URL action 176*a-c*, and trajectory action 178*a-c*. These four general categories of action of the user 112*a* and/or the client 102*a* associated with the client articles are given only for purposes of illustration of one exemplary embodiment. It should be appreciated that in alternative embodiments, a subset of these four categories and/or other categories of action may be utilized.

In FIG. 2, client articles 171*a-c* are depicted to illustrate that the monitoring engine 140 can monitor a plurality of articles associated with one or more applications and create client-side behavior data associated with each article individually. The types of actions and data illustrated in FIG. 2 are offered only as examples of types of client-side behavior actions and data associated with client articles 171*a-c* associated with the client applications 170*a-c*. Other types of client-side behavior actions and data associated with client articles 171*a-c* can be utilized within the scope of the present invention.

After determining the corresponding client-side behavior data for the client articles 171*a-c*, the monitoring engine 140 processes the client-side behavior data associated with the client articles 171*a-c* so that it can be received by a client behavior data database 164 located within a data store 160. The monitoring engine 140 can determine client-side behavior data for multiple user articles and ensures that the client-side behavior data associated with an article can be identified with that particular article. The monitoring engine 140 transmits the client-side behavior data, together with identifying information that associates the data with a particular article to which it relates, to the data store 160 for storage in a manner that preserves associations between the article and the client behaviors.

As an example of the functioning of the monitoring engine 140, consider a user 112*a* working with an article, such as a web page, associated with an Internet browser application. In this example, the web page can be represented by the client article 171*a* of FIG. 2 and the Internet browser application can be represented by the client application 170*a*. As the user 112*a* interacts with the client article 171*a* client behavior data is monitored and received by the monitoring engine 140. For example, if the user 112*a* types a URL into client application 170*a*, the monitoring engine 140 detects this activity and receives URL data 177*a* comprising, for example, data indicating whether the user 112*a* typed the URL or selected a link, and text of the URL. If the user 112*a* then accesses a login page for a social network, for example, the monitoring engine 140 can detect the login page as the start of a trajectory and can attribute activity on subsequent pages within the social network at least in part to the login page. Additionally, the monitoring engine 140 can determine the amount of time the user 112*a* spends on articles, such as web pages within the social network.

The monitoring engine 140 then configures the client-side behavior data to be received by the client behavior data database 164 located within the data store 160 in a manner so that it remains associated with the article to which it relates. Thus, in the present example, the monitoring engine 140 creates client-side behavior data in response to the typing, saving, and emailing of the user 112*a*. This client-side behavior data can be associated with the web page article that the user 112*a* was using when the events generating the client-side behavior data occurred. This association can be preserved in the data store 160 so that if the web page article is determined by the article locator 134 to be relevant to the query signal 182, the client behavior data processor 136 can retrieve the client-side behavior data associated with the web page article.

The client-side behavior data created by the monitoring engine 140 can then be used to score or rank the article by the search engine 120. For example, an article associated with frequent access and a typed URL can receive a higher ranking score than an article associated with infrequent access or an article accessed by selecting a hyperlink. The frequent access and manually entered URL likely indicates a higher interest of the user 112*a* in the article associated with this activity. A web page, for example, that is merely accessed by selecting a link and viewed only once is less likely to be useful to a user 112*a* than a web page accessed frequently by the user 112*a*, for which the user 112*a* specifically enters the URL by hand.

It should be noted that the present invention can comprise systems having different architecture than that which is shown in FIGS. 1 and 2. The system 100 shown in FIG. 1 and the detailed view of the monitoring system shown in FIG. 2 are merely exemplary, and are used to explain the exemplary methods shown in FIGS. 3-5.

Various methods in accordance with the present invention can be carried out. One exemplary embodiment comprises receiving a search query, determining a relevant article associated with the search query, and determining a ranking score for the relevant article based at least in part on duration data associated with the relevant article. The duration data can comprise determining a graph wherein the graph can comprise nodes representing URLs and edges representing connections between the nodes. The duration data can further comprise an amount of time spent on a request path, or an amount of time on a domain name. Additionally, the amount of time on a higher domain name can be attributed to a lower level domain name, as described in further detail below.

Another exemplary embodiment comprises receiving a search query, determining a relevant article associated with the search query, and determining a ranking score for the relevant article based at least in part on access data associated with the relevant article. The access data can comprise a number of days with greater than zero access, an amount of time since the article was last accessed, or a frequency of user access. In another embodiment articles associated with a frequency of user access are added to a link library. In another embodiment, the ranking score can be a function of the amount of time since the article was last accessed. According to various embodiments, the function can be a piecewise function, or a linear function, or an exponential function, or a nonlinear function.

Another exemplary embodiment comprises receiving a search query, determining a relevant article associated with the search query, and determining a ranking score for the relevant article based at least in part on URL data associated with the relevant article. The URL data can comprise whether the URL was typed, whether the URL was selected by a hyperlink, or whether the URL was completed automatically by a computer functionality.

Another exemplary embodiment comprises receiving a search query, determining a relevant article associated with the search query, and determining a ranking score for the relevant article based at least in part on trajectory data associated with the relevant article. The trajectory data can comprise, for example, determining a login page or determining a logout page. In another embodiment, an article at a beginning of a trajectory can be ranked higher than an article at an end of a trajectory.

Figure 3:
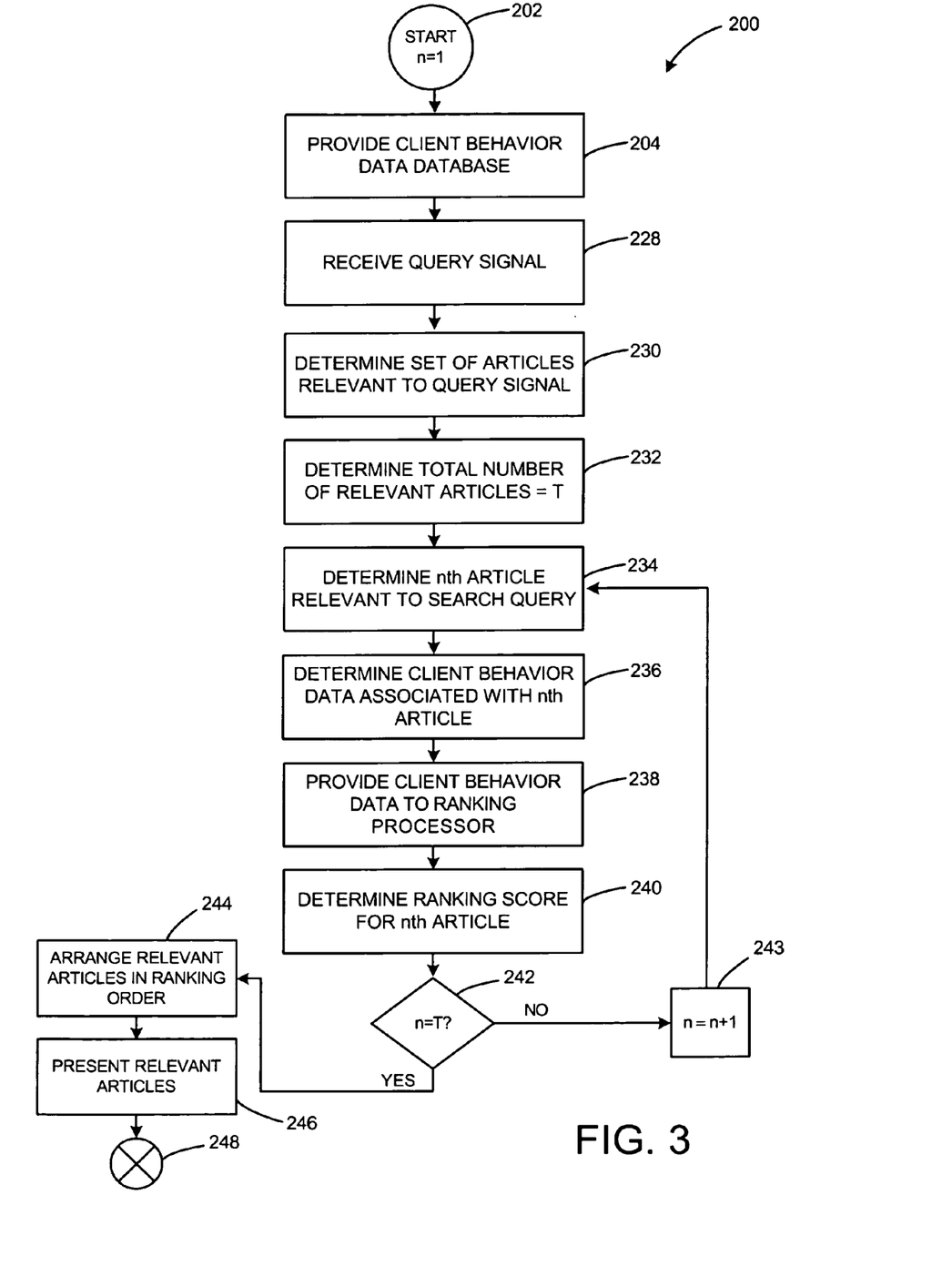
FIG. 3 illustrates a flow diagram of a method in accordance with one embodiment of the present invention.
Figure 4:
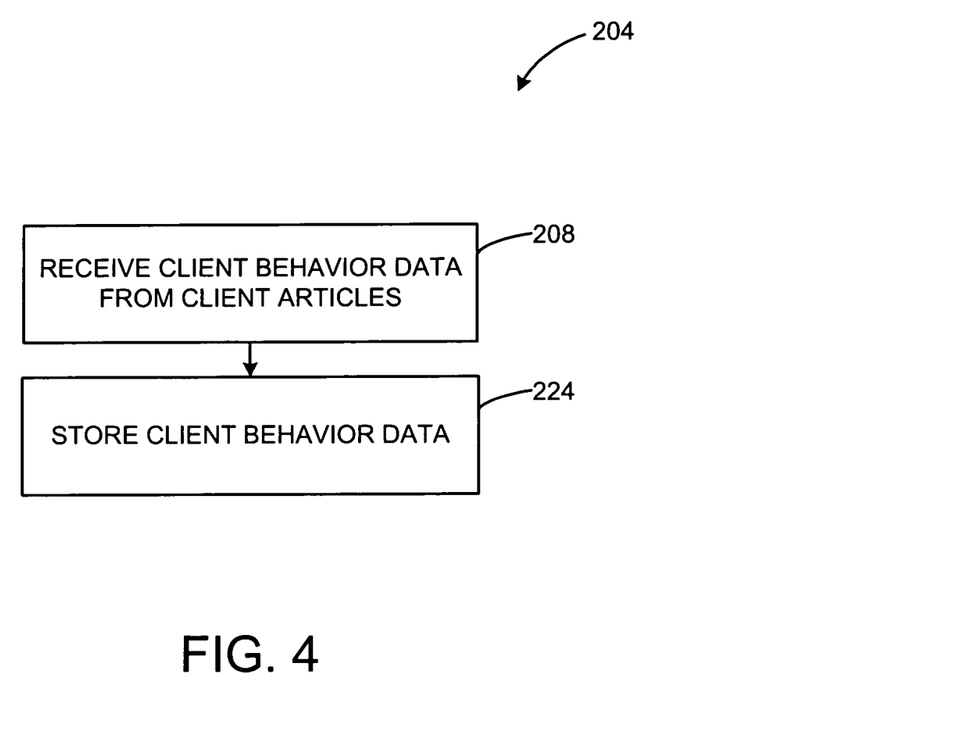
FIG. 4 illustrates a flow diagram of one embodiment of a subroutine of the method shown in FIG. 3.
Figure 5:
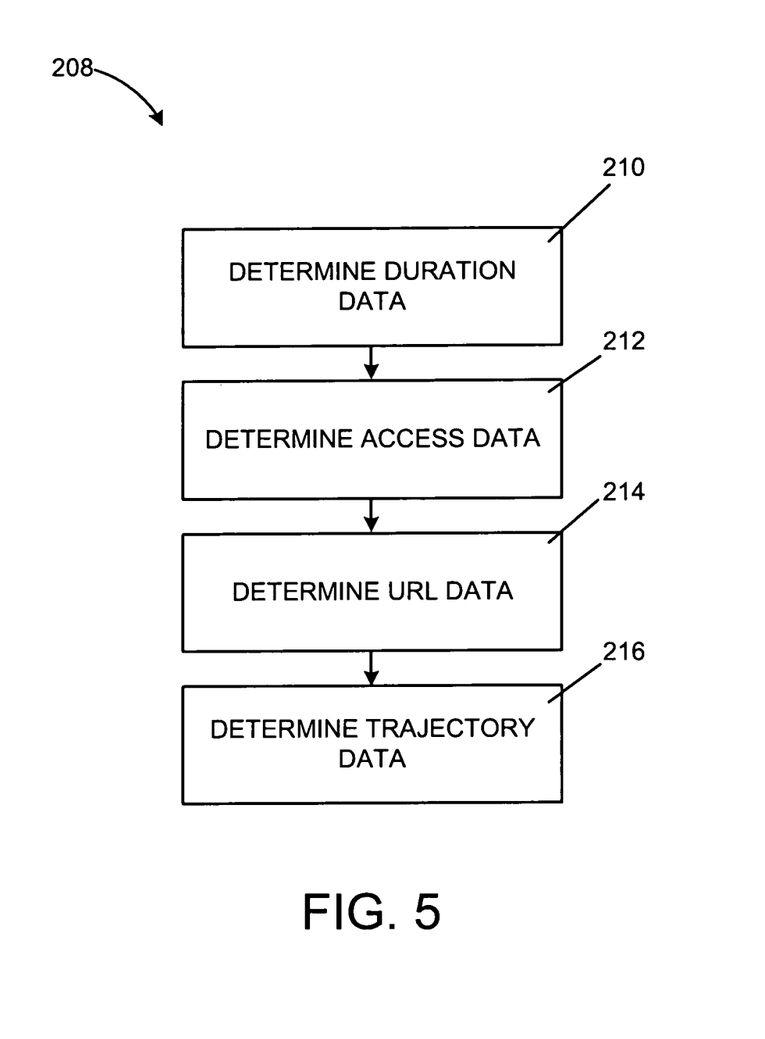
FIG. 5 illustrates a flow diagram of one embodiment of a subroutine of the subroutine show in FIG. 4.

FIGS. 3 through 5 illustrate various aspects of exemplary methods according to exemplary embodiments of the present invention. FIG. 3 illustrates an exemplary method 200 in accordance with one embodiment of the present invention. This exemplary method is provided by way of example, as there are a variety of ways to carry out methods according to the present invention. The method 200 shown in FIG. 3 can be executed or otherwise performed by any of various systems. The method 200 is described below as carried out by the system 100 shown in FIGS. 1 and 2 by way of example, and various elements of the system 100 are referenced in explaining the example methods of FIGS. 3-5. Methods according to the present invention may be embodied in other ways, including network searching, server-side searching, combined searching, and other systems.

The method 200 shown provides an improvement of client-side searching by providing for ranking search results based on client behavior data. For example, if the user 112*a* desires to retrieve articles relating to digital cameras that the user 112a recently viewed over the network 106, the user 112a can enter the term "digital camera" as the search query 114. The present invention can take the search query 114—"digital camera"—and locate articles that are relevant to the search. This can include, for example, an Internet auction web page containing listings of digital cameras, a retail home page selling digital cameras, and a search results page listing digital cameras. Not all of the articles located as being relevant to the search query 114 will necessarily be of high interest to the user 112a. The present invention reflects this by ranking the relevant articles according to various actions of the user 112a when accessing the articles. For example, if the user 112a typed in the URL for the Internet auction site and accessed a login screen and then proceeded to view the articles listing digital cameras and repeatedly accessed the web pages showing digital cameras over multiple days, it is likely that the user 112a had a higher interest in the web pages from the Internet auction site. If, on the other hand, the user 112a accessed the retail home page merely by clicking on a link and visited it on only one or two occasions, it is less likely that it is of primary interest to the user 112a. Thus, the present invention can reflect the relative importance of the web pages associated with the Internet auction site by associating them with a higher ranking score. Thus, when the results of the search query 114 are returned to the user 112a, the pages associated with the Internet auction site associated with a higher ranking score can be presented in a way that emphasizes it over the retail home page. For example, the web pages associated with the Internet auction site can be presented first in a list of search results. Emphasizing the web pages associated with the Internet auction site can help the user 112a quickly and easily select it from a list of search results. Additionally, the user 112a can select a first link in a listing of search results, move to a first web page associated with the first link and then quickly return to the listing of search results and select a second link. The present invention can detect this behavior and determine that the first web page is not relevant to what the user 112a wants. The first web page can be down-ranked, or alternatively, a second web page associated with the second link, which the user 112a views for longer periods or time, can be up-ranked.

Each block shown in FIGS. 3-5 represents one or more processes, methods or subroutines carried out in the exemplary method 200. Referring to FIG. 3, in block 202, the example method 200 begins. In block 202, a counter variable n can be set to 1. The counter variable n can be used to regulate how many iterations of the method 200 are completed for a given search. Block 202 is followed by block 204, in which a client behavior data database is provided. This can be accomplished by, for example, constructing such a database with the assistance of a monitoring engine 140 or establishing communication with such a database.

Referring now to FIG. 4, FIG. 4 is a more detailed view of block 204 from FIG. 3, and illustrates an example of a method for providing a client behavior data database. The method shown in FIG. 4 begins at block 208, in which, according to the illustrated example, client-side behavior data associated with an article can be determined by a monitoring engine 140. As illustrated in FIG. 2, this client-side behavior data can comprise any number of separate types of data including, for example, duration data 173a, access data 175a, URL data 177a, or trajectory data 179a. Other suitable types of client-side behavior data can also be received in block 208 of FIG. 4. Alternatively, the client behavior data can be received from a pre-existing database.

FIG. 5 illustrates a more detailed view of block 208 from FIG. 4. FIG. 5 begins with block 210, in which duration data can be determined. Duration data can comprise, for example, data relating to the duration of time the user 112a spends accessing an article, such as a web page. Duration data can be used alone or in combination with other duration data. Other time-related or duration data can comprise, for example, an amount of user activity within an article. The amount of user activity within an article can be used to determine whether an amount of time spent accessing an article reflects actual user interaction with an article or whether the duration on the article is due merely to user inactivity following accessing an article. For example, the amount of user activity with an article can be used to distinguish whether the user is actually viewing an article, such as a web page, or whether the web page has merely been left active on the client device 102a while the user 112a is away from the client 102a.

Duration data can comprise, for example, a network graph comprising nodes representing URLs visited by the user 112a and edges representing connections between the URLs. The nodes can further comprise node labels that indicate how many times, how frequently, or how recently, for example, the user 112a has visited the URL. A weight can be assigned to each node proportional to the node label and weights for nodes can be propagated to connected nodes. For example, the user 112a can frequently visit www.cnn.com/world/ as a top level domain and visit web pages linked to from www.cnn.com/world/. The frequency and time associated with nodes representing web pages linked to www.cnn.com/world/ can be propagated in whole or in part back to www.cnn.com/world/.

Furthermore, duration data can comprise data associated with duration on a host. Data associated with duration on a host can comprise, for example, how much time is spent on an article comprising a subset of a host article. For example, if a user spends time on a web page www.google.com/search/images.html, the time or a portion of the time spent on this web page can be attributed to the host web page www.google.com. In this way, the importance of a host web page can not only reflect the amount of time a user spends directly on the host web page, but also the amount of time a user spends on an associated web page hosted by the host web page. Additionally, the present invention can determine an amount of time associated with a request path or a first domain name and attribute a portion of the time spent on the request path or first domain name to a second domain name. A request path can comprise, for example, a web page comprising a particular page within a website. A request path can be represented by a portion of a URL address following a forward slash. For example, in the URL http://www.google.com/search/images.html, the portion following the second forward slash—"search/images.html"—can represent a request path. A domain name can comprise a root level domain, for example, ".com" and a higher level domain name, for example, www.google.com. A higher level domain name can comprise multiple levels, for example, multiple names separated by a period. A second level domain name can represent a host web page or a website. For example, www.google.com is a second level domain name representing a host web page. A higher level domain name can represent a page hosted by a host web page or website. For example, the address www.news.google.com, is a third level domain name and can represent a news page hosted by www.google.com. A request path can represent a web page comprising a page within a website. For example, the request path search/images.html represents an images search page hosted by the website www.google.com.

In one embodiment of the present invention, a client-side search application can determine an amount of time spent on a request path—in the preceding example, the images search page—and attribute a portion of this time to a domain name—in the example above, the Google home page. Thus, for example, a user can frequently visit a news home page for only a brief period of time and then spend a more significant amount of time on pages within the news website such as individual news reports. The individual news reports can comprise request paths represented, for example, by a URL www.newspage.com/report1, where "report1" represents an individual news report. The duration data associated directly with the news home page in this example can reflect only a short amount of time and thus weighted accordingly. However, the news home page is significant to the user $112a$ as a source of finding news reports. Additionally, the individual news reports in the present example are accessed for a longer duration of time than the news home page and yet each individual report may only be of interest to the user on a single occasion. In order to properly reflect the relative importance of the news home page that receives a small amount of actual duration time, and to reflect the lesser importance of individual news reports that receive a longer duration time on a single occasion, the present invention can attribute a portion of the time spent on the individual news reports to the news home page.

In another embodiment, an amount of time the user $112a$ spends on articles up to a specified maximum number of links from a starting article can be attributed to the starting article. The time spent on articles one link away may have the highest weight, while articles two or more steps away may have decreasing weight. Additionally, an average duration the user $112a$ spends on a particular type of article can be determined. For example, the user $112a$ can spend an average time of 15 seconds viewing web pages. Web pages that are viewed for significantly longer can have higher ranking scores assigned to them. In determining an amount of time a web page is viewed, the present invention can determine, among other things, whether any scrolling or other activity is conducted on a page as an indication that the user $112a$ is actually viewing the page and has not merely left a web page open while conducting other activity.

Block 210 is followed by block 212 in which access data is determined. Access data can comprise, for example, a number of days an article is accessed at least once. Access data enables the system to determine, for example, articles accessed consistently over a number of different days as distinguished from an article accessed a same number of total times that is only accessed on a relatively few number of different days. For example, the user $112a$ can visit a news home page everyday only once and then move on to an article linked to the news home page, for example, a news report. The user $112a$ can then access the individual news report repeatedly throughout the day. Because the news home page is visited only once per day, and the article is visited repeatedly in the same day, the number of times the article is accessed can be similar to the number of times the news home page is visited. On subsequent days however, the user is less likely to be as interested in the individual news report, even though it can be associated with a similar number of total accesses as the news home page. Thus the present invention can determine a number of days with greater than zero accesses for an article in order to distinguish articles accessed consistently by the user $112a$ over time from articles accessed a similar number of total times, but only over a relatively few number of days.

Access data can further comprise an amount of time elapsed since an article was last accessed by a user. For example, the monitoring engine 140 can determine an amount of time since the user $112a$ last opened a text document. An importance of an article can be dependent on the amount of time elapsed since the article was last accessed. The relationship between the importance of a document and the amount of time elapsed since the article was last accessed can be simply a linear or exponential relationship. For example the document can become increasingly less important as the elapsed time increases. The relationship can also be a nonlinear, non-exponential, or piecewise function of the elapsed time. A piecewise function can comprise, for example, a combination of linear, exponential, or other functions. For example, in one embodiment, for elapsed times less than a few days, a constant level of importance, independent of the amount of elapsed time since last access, can be determined. For periods of time between a few days and one month, an exponential relationship can be determined such that the importance of an article decreases exponentially with the amount of elapsed time. And for periods greater than one month, a relationship can be determined such that the importance of an article decreases much more slowly with the amount of elapsed time.

For example, consider the user $112a$ working with a particular article such as a business report. The user $112a$ can be editing and accessing the report on a daily basis for the first few days after the report is first accessed. The user $112a$ can then move on to another project unrelated to the report. After several months the user $112a$ can again desire to access the report, for example, to remember some information contained in the report. In this example, the user $112a$ may not desire to view the report in a listing of search results over the first few hours or days as the user $112a$ can likely recall the contents of the article or access it directly. After the first few days the user $112a$ can be working on other projects but still need to refer occasionally to the report. Thus after the first few days, the user's $112a$ desire to view the article in a listing of search results may initially be high and then decrease fairly rapidly over the next month as other the user $112a$ shifts his attention to other projects. After the importance of the report decreases over a period of a month or so, for example, the importance can cease to decline as rapidly, and maintain a basic level of importance that decreases slowly over time. A piecewise function that uses a combination of functions for different intervals of time may thus effectively represent the importance of the report to the user $112a$ over time.

Block 212 is followed by block 214 in which URL data is determined. URL data can comprise, for example, data associated with whether a user types a URL into an address field of an application or whether a user accesses a URL by clicking on a link associated with the URL. URL data can attribute significance to a URL that is accessed by typing the URL versus a URL that is accessed by clicking on a link to the URL. A URL that is actually typed into an address field of an application by a user can imply a specific desire to access the particular URL as distinguished from a URL merely stumbled upon in a link as the user $112a$ is browsing through various articles. Additionally, URL data can comprise data associated with whether a typed URL was automatically filled in by a computer functionality. For example, some Internet browser applications have a functionality that can complete the remainder of a URL after the user $112a$ types a portion of the URL. A URL that is entered entirely by the user can represent a more significant URL since the user knew the entire URL and took the time to type it in. On the other hand, a URL that the user $112a$ only knows a portion of and relies on a computer functionality to fill in the remainder may not be as significant. Alternatively, the user $112a$ can desire to be presented with a URL, which the user $112a$ does not know entirely, in a listing of search results so that it can be quickly recalled. The present invention can utilize a combination of URL data, and user preference data comprising, for example, a record of which types of URLs the user 112a selects from a listing of search results, to determine how the URL data can best be used for a particular user. For example, if the user 112a frequently selects URLs from a listing of search results that were completed by a computer functionality after typing only a portion of the URL and rarely selects URLs that were entered entirely by the user 112a, the present invention can utilize this combination of preference data and URL data to determine a higher score for articles associated with URLs completed by a computer functionality. Additionally, hyper links from web pages can be distinguished from links from emails and the email links can receive a higher ranking score as they can be of greater use to the user 112a.

Block 214 is followed by block 216 in which trajectory data is determined. Trajectory data can include, for example, data associated with articles accessed by the user 112a to start a trajectory of associated articles. For example, a login page can start a user on a trajectory, or sequence, of associated pages and may be more significant to the user than the associated pages and, therefore, merit a higher ranking score. For example, the user 112a may visit the login screen for a social network website only briefly and then spend more time browsing through pages within the social network website. The user 112a can then end the session on the social network website by logging out on a logout page. The login page can represent the start of a trajectory comprising the sequence of pages within the social network accessed by the user 112a. The logout page can represent an end of the trajectory comprising the sequence of pages accessed by the user 112a. The login page and the logout page may both be visited for only a short amount of time and may both be visited with the same frequency. Thus the access data and duration data for the login page and logout page can be similar. However, the user 112a is likely to prefer to be presented with the login page within a listing of search results, as it can more likely lead to the desired information. For example, the user 112a may want to access a web page within the social network that was previously accessed. In order to do so, the user 112a can first access the login screen. Thus, the present invention can utilize the trajectory data associated with the login page to determine a higher score for the login page, at the start of a trajectory, than for the logout page at the end of a trajectory, or for other associated pages.

Trajectory data can further comprise determining an article hub. An article hub can comprise, for example, an article frequently returned to as a source of links for other articles. For example, the user 112a can start at news.google.com and go back and forth through news.google.com linking to other web pages. In this example, news.google.news.com can be a hub for the user 112a. A hub article can receive a high ranking score even though no individual visit to hub article is relatively long in duration. Furthermore, a hub article can have a session associated with it. The session can comprise, for example, a sum of time spent on individual articles linked to the hub article. For example if the user visits ten different new articles linked to the news.google.com hub article for a total of one minute each, the session can comprise the ten minutes spent on articles linked to the hub article. A total time for the session can be used in determining a ranking score for the hub article.

The method 208 illustrated in FIG. 5 ends with block 216. For blocks 210 to 216, each block can be optional and may not be included, or may have no data for a particular article. Determining client-side behavior data can be continuous, even though only one loop of such monitoring is shown in FIG. 5 for purposes of illustration. The method of FIG. 5 is a subroutine carried out in block 208 of the method of FIG. 4.

Returning now to FIG. 4, it is a subroutine of the method of FIG. 3. Block 208 of FIG. 4 is followed by block 224, in which the client-side behavior data is stored. The client-side behavior data can be stored, for example, in the data store 160, in the memory 108, or in any other storage medium associated with the client 102. Block 224 is the last block illustrated in the subroutine of FIG. 4.

Referring now again to FIG. 3, block 204 is followed by block 228, in which a query signal 182 is received by a search engine 120. While FIG. 3 illustrates an embodiment of the method 200 comprising receiving a search query, the present invention can also be carried out independent of receiving a search query. For example, a query independent score can be determined for articles based on user behavior data associated with the articles. The query independent score can be presented to the user on a one-click-away page. The one-click-away page can comprise, for example, a listing of frequently viewed articles or articles determined to be of interest to the user 112a and can list a query independent score for each of the articles. Additionally, the query independent score can be displayed in a toolbar within an Internet browser or other application window displaying an article associated with a query independent score. For example, if the user opens a text document in a text editing application, a toolbar within the text editing application can display the query independent score for the text document. The embodiment depicted in FIG. 3, for purposes of illustration, includes receiving a query signal. In the embodiment depicted in FIG. 3, the query signal 182 can be generated in response to a search query 114 entered explicitly by the user 112a, or through an implicit search query generated from contextual clues from the monitoring engine 140. For example, if the user 112a is using an email application to compose an email and types the phrase "I am looking for a digital camera" into the email, the query processor 180 can receive information regarding the input text from the monitoring engine 140 and generate an implicit query to search for articles containing the terms "digital camera." The query processor 180 can then send the query signal 182 reflecting this implicit search query to the search engine 120.

Block 228 is followed by block 230, in which a set of relevant articles relevant to the query signal 182 is determined by the article locator 134. In this block, the article locator 134 located within the search engine 120 determines a relevant article or a plurality of relevant articles from article data located in the data store 160 or memory 108. For example, if the search query 114 input by the user is "digital camera," the article locator 134 can determine which articles in the data store 160 or the memory 108 are relevant to the search terms. This set can comprise, for example, emails, web pages, chat sessions, and other articles that contain the words "digital camera." The relevant articles determined in this block are potentially numerous compared to the search result 150 that can ultimately be returned to the user 112a following a ranking, sorting, and presenting of the relevant articles. The relevant articles determined in this block can be sorted by relevance using a traditional method without client-side behavior information, or can be sorted by date.

Block 230 is followed by block 232, in which a total number of relevant articles T in the set of relevant articles returned by the article locator 134 is determined. Preferably, the total number of relevant articles T reflects all of the articles determined to be relevant to the search, though other embodiments can use a different number (e.g. a maximum of 100, or as many as can be processed within a given amount of time). The variable T is used in connection with a counter n to determine how many iterations of part of the shown method 200 to complete.

Block 232 is followed by block 234, in which the search engine 120 determines an "$n^{th}$" relevant article from the total number of relevant articles T associated with the query signal 182. During the first iteration of the method 200, the counter n is equal to 1 and so the search engine 120 determines the first relevant article associated with the query signal 182. On subsequent iterations, the search engine 120 determines the subsequent relevant document within the total number of relevant articles T. In alternate embodiments, the relevant articles associated with the query signal 182 can already be sorted. For example, the articles can be sorted by a relevance measure that does not include client behavior data, or the articles can be sorted by date.

Block 234 is followed by block 236, in which client-side behavior data associated with the $n^{th}$ article is determined. In this block 236, in the embodiment shown, the client behavior data processor 136 located within the search engine 120 receives from the article locator 134 information indicating the $n^{th}$ article associated with the query. The client behavior data processor 136 then determines the client-side behavior data from the data store 160 that is associated with the $n^{th}$ article determined by the article locator 134 to be relevant to the query signal 182.

For example, if the query signal 182 relates to a search query 114 for "digital camera" then the article locator 134 can locate all articles relevant to this query which can comprise, for example, all articles with the words "digital camera" in the text, title, subject field, etc. A particular $n^{th}$ article can then be selected from all the relevant articles determined to be relevant to this query. The $n^{th}$ article in this example can be, for example, a recently visited web page containing text associated with digital cameras. According to the embodiment illustrated here, the client behavior data processor 136 can then retrieve from the data store 160 all client-side behavior data associated with the web page. This can include, for example, URL data including whether the web page was accessed by typing a URL or selecting a link, access data comprising how often the web page was visited and how long ago, duration data including the amount of time spent on the web page or associated request paths or other associated web pages, and trajectory data including whether the web page is linked to a login page. This client-side behavior data can then be used in block 238 to help formulate a ranking score for the article.

In block 238, which follows block 236, client-side behavior data associated with the $n^{th}$ article is provided to the ranking processor 138. In this block 238, the client-side behavior data determined by the client behavior data processor 136 to be associated with the $n^{th}$ article relevant to the query signal 182 is retrieved from the client behavior data database 164 within the data store 160. The client-side behavior data retrieved from the client behavior data database 164 can then be sent to the ranking processor 138. Thus, in this block, the client-side behavior data associated with an article determined to be relevant to the query signal 182 is retrieved and sent to the ranking processor 138 where it can be used to generate a ranking score as described in block 240.

In other embodiments, a "client behavior score" reflecting the relative frequency and type of interactions by the user 112a and/or client 102a with an article or a type of article, for example a web page or web pages from a particular site, can be determined and stored in the data store 160. According to aspects of embodiments comprising a client behavior score, when the search engine 120 receives a query signal 182, the client behavior score can be sent to the ranking processor 138 instead of, or in addition to, the client-side behavior data associated with the article. The client behavior score can be predetermined.

Following block 238 is block 240, in which a ranking score for the $n^{th}$ article is determined. In this block 240 in the embodiment shown, the ranking processor 138 receives the client-side behavior data from the client behavior data processor 136. The ranking processor 138 also receives the query signal 182. The ranking processor 138 determines a ranking score based at least in part on the client-side behavior data, retrieved from the client behavior data processor 136, associated with the $n^{th}$ article. This can be accomplished, for example, by a ranking algorithm that weights the various client behavior data and other ranking factors associated with the query signal 182 to produce a ranking score. The different types of client behavior data can have different weights and these weights can be different for different applications. In addition to the client behavior data, the ranking processor 138 can utilize conventional methods for ranking articles according to the terms contained in the articles. It can further use information obtained from a server on a network, for example in the case of web pages, the ranking processor 138 can request a PageRank value for the web page from a server and additionally use that value to compute the ranking score. The ranking score can also depend on the type of article. The ranking score can further depend on the time such as the time of day or the day of the week. For example, a user can typically be working on and interested in certain types of articles during the day, and interested in different kinds of articles during the evening or weekends.

Consider again the example where a user 112a desires to retrieve articles relating to digital cameras. The user 112a can enter the terms "digital camera" as a search query 114. A query signal 182 corresponding to the search query 114, "digital camera," can be generated and the article locator 134 can locate articles that are relevant to this search. This can include an Internet auction site containing listings of digital cameras, a retail home page selling digital cameras, and a search results page listing digital cameras. Once relevant articles are located, the client behavior data processor 136 can determine what client-side behavior data is associated with that article. For example, if the user 112a typed in the URL for the Internet auction site and accessed a login screen and then proceeded to view the articles listing digital cameras and repeatedly accessed the pages showing digital cameras over multiple days, this can be reflected in the URL data, access data, and trajectory data. Similarly, if the user 112a accessed the retail home page merely by clicking on a link and visited it on only one or two occasions, this too can be reflected in the URL data and access data associated with the retail home page. In block 240 the client behavior data associated with the Internet auction site can be used to generate a ranking score for the Internet auction site and the retail home page.

Block 242 follows block 240. In block 242, it is determined whether the current article number n is equal to the total number of search results T. If n is equal to T, then the method proceeds to block 244. If n is not equal to T, the method proceeds to block 243. In block 243 $n$ is incremented to the next integer and the method returns to block 234 to repeat the blocks 234-242. A threshold can be used on the number of articles to process or the processing time, such that less than T articles are processed. For example, no more than 1,000 articles may be processed, or processing may only be allowed to take a maximum of 500 ms.

For example, on the first run through the method 200, n is equal to 1 and so the first relevant article is selected from the set of relevant articles. If there are 10 documents in the set of relevant articles then T is equal to 10. In block 242, since 1 is not equal to 10, the method can proceed to block 243 where n can receive the value n+1, which can make n now equal to 2. This process repeats until n is equal to 10. When n is equal to 10, the tenth (and final) article can be selected from the set of relevant articles. Then in block 242, since n is now equal to T, the method 200 can proceed to block 244. In block 244, the relevant articles processed in blocks 234-240 are arranged in a ranking order according to the ranking score associated with each relevant article from block 240. According to some embodiments, a predetermined ranking score for an article can be determined when the user behavior associated with the article occurs. The ranking score determined when the user behavior associated with the article occurs can then be used when a search query is received in order to decrease the time required for processing the search query. In order to ensure that the predetermined ranking score is current, the predetermined ranking score can periodically be recalculated and factors such as an amount of time elapsed since the article was last accessed can be included in determining a new predetermined ranking score.

Block 244 is followed by block 246, in which the relevant articles arranged in a ranking order in the block 244 are presented to the user 112a. There are numerous ways in which the results can be presented to the user 112a that can reflect the ranking order from block 244. One possible way is to list the top three articles as hyperlinks and to list a single hyperlink to all other relevant articles, which the user can select if the desired article is not located within the three hyperlinks. In another embodiment the results can be presented on a home page such as a one-click-away page. A one-click-away page can comprise a listing of frequently viewed articles or articles determined to be of interest to the user 112a. In another embodiment, frequently accessed articles, or articles otherwise associated with high user interest can be added to a link library. The link library can comprise, for example, a set of links to articles on the network 106 and can include, for example a favorites folder or other set of URLs frequently visited by the user 112a.

Block 246 is followed by block 248, in which the method 200 ends. In other embodiments of the method 200 a query independent score can be determined when user behavior data associated with an article occurs. PageRank™, although not employed here, is an example of a method that can compute a query-independent score. When a query is received, the method 200 can combine the query-independent score with conventional matching methods. In one version, the articles can be processed in the order specified by the query-independent user behavior score. This allows the system to save processing time because it may not be necessary to process all articles. Additionally, the processing can be split into phases where the first phase produces an initial score based on the query-independent user behavior score and conventional methods, and a second phase does more expensive processing on the highest ranked articles from the first phase. One or more scores based at least in part on client-side behavior data can also be shown to the user without reference to a search query. For example, the score or scores for a web page can be shown in a toolbar when the user browses to a site.

The present invention is not limited to returning results based on only client-side articles or searching only client-side articles. By way of example, additional embodiments of the present invention can comprise combining search results from a network, such as the Internet or a local intranet, with the search results obtained by the method 200. Additionally, the present invention can determine a ranking score for an article in part on client-side behavior data and in part on Internet ranking scores. Moreover, the present invention can use client-side behavior data, alone or in combination with other factors, to determine a ranking score for articles located on a network such as the Internet or a local intranet. The present invention can use client-side behavior data, alone or in combination with other factors, to determine a ranking score for articles located on a client 102a, for articles located on a network 106, such as the Internet or a local intranet, or any other article stored on any medium or in any location accessible by the search engine 120 locally or over a remote connection.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method performed by a computer, comprising:
    identifying an article;
    receiving trajectory data associated with the article indicating whether the article is a web page that started a user on a sequence of associated web pages;
    determining a ranking score for the article based at least in part on the trajectory data associated with the article, wherein the ranking score is higher responsive at least in part to a positive indication that the article is a web page that started the user on a sequence of associated web pages;
    arranging the article with at least one other article in a ranking order responsive at least in part to the ranking score; and
    presenting the arranged articles to a user in the ranking order.

2. The method of claim 1, wherein the article is a client-side article.

3. The method of claim 1, wherein the article is a network article.

4. The method of claim 1, wherein identifying the article comprises receiving user behavior associated with the article.

5. The method of claim 1, wherein identifying the article comprises receiving a search query and determining the article to be relevant to the search query.

6. The method of claim 1, wherein identifying the article comprises identifying a frequently accessed article for a one-click-away page.

7. The method of claim 1, wherein receiving trajectory data comprises determining a login page as the start of a trajectory.

8. The method of claim 1, wherein receiving trajectory data comprises determining a logout page as the end of the trajectory.

9. The method of claim 1, wherein an article at a beginning of a trajectory is ranked higher than an article at an end of a trajectory.

10. The method of claim 1, wherein receiving trajectory data comprises determining an article.

11. A computer-readable storage medium containing computer-executable program code comprising:
    program code for identifying an article;
    program code for receiving trajectory data associated with the article indicating whether the article is a web page that started a user on a sequence of associated web pages;
    program code for determining a ranking score for the article based at least in part on the trajectory data associated with the article, wherein the ranking score is higher responsive at least in part to a positive indication that the article is a web page that started the user on a sequence of associated web pages;

program code for arranging the article with at least one other article in a ranking order responsive at least in part to the ranking score; and program code for presenting the arranged articles to a user in the ranking order.

12. The computer-readable medium of claim 11, wherein the article is a client-side article.

13. The computer-readable medium of claim 11, wherein the article is a network article.

14. The computer-readable medium of claim 11, wherein identifying the article comprises receiving user behavior associated with the article.

15. The computer-readable medium of claim 11, wherein identifying the article comprises receiving a search query and determining the article to be relevant to the search query.

16. The computer-readable medium of claim 11, wherein identifying the article comprises identifying a frequently accessed article for a one-click-away page.

17. The computer-readable medium of claim 11, wherein receiving trajectory data comprises determining a login page as the start of a trajectory.

18. The computer-readable medium of claim 11, wherein receiving trajectory data comprises determining a logout page as the end of a trajectory.

19. The computer-readable medium of claim 11, wherein an article at a beginning of a trajectory is ranked higher than an article at an end of a trajectory.

20. The computer-readable medium of claim 11, wherein the trajectory data comprises determining an article.

21. A computer system, comprising:

a processor for executing computer program instructions;

a computer-readable storage medium having computer-executable program instructions embodied therein comprising:

means for identifying an article;

means for receiving trajectory data associated with the article indicating whether the article is a web page that started a user on a sequence of associated web pages;

means for determining a ranking score for the article based at least in part on the trajectory data associated with the article, wherein the ranking score is higher responsive at least in part to a positive indication that the article is a web page that started the user on a sequence of associated web pages;

means for arranging the article with at least one other article in a ranking order responsive at least in part to the ranking score; and means for presenting the arranged articles to a user in the ranking order.

22. The system of claim 21 further comprising:

means for receiving a search query; and means for determining the article is relevant to the search query.

23. The system of claim 21, wherein identifying the article comprises identifying the article for a one-click-away page.

24. A method performed by a computer, comprising:

receiving a query signal from a query processor;

determining trajectory data associated with one or more articles within a set of articles responsive at least in part to the query signal and a client behavior database, wherein the trajectory data comprise an indication of whether the article is a web page that started a user on a sequence of associated web pages;

determining a ranking score for the article based at least in part on the trajectory data, wherein the ranking score is higher responsive at least in part to a positive indication that the article is a web page that started the user on a sequence of associated web pages;

arranging the one or more articles in a ranking order based at least in part on the ranking score; and causing output of the one or more articles.

25. A method performed by a computer to provide ranked articles, comprising:

identifying one or more articles;

receiving user behavior data associated with the one or more articles;

determining trajectory data responsive at least in part to the user behavior data, wherein the trajectory data indicate whether an article of the one or more articles is a web page that started a user on a sequence of associated web pages;

determining a ranking score for each of the one or more articles based at least in part on the trajectory data, wherein the ranking score is higher responsive at least in part to a positive indication that the article is a web page that started the user on a sequence of associated web pages;

arranging the one or more articles in a ranking order responsive at least in part to the one or more ranking scores; and presenting the arranged one or more articles to a user in the ranking order.

26. The method of claim 25, wherein the one or more articles is comprised of one or more HTML files, XML files, XHTML files, PDF files, word processor files, database files, application document files, chat messages, email messages, audio files, or video files.

27. The method of claim 25, wherein the user behavior data indicate a number of times the user views the one or more articles.

28. The method of claim 25, wherein the user behavior data indicate an amount of time spent by the user viewing the one or more articles.

29. The method of claim 25, wherein the user behavior data indicate an amount of time elapsed since the one or more articles were last accessed by the user.

30. The method of claim 25, wherein the user behavior data indicate a time of day in which the one or more articles were accessed by the user.

31. The method of claim 25, wherein the user behavior data indicate a day of the week in which the one or more articles were accessed by the user.

32. The method of claim 25, wherein the trajectory data further indicate whether the article is a web page acting as an article hub to which the user frequently returned as a source of links for other articles and wherein the ranking score for the article is higher responsive at least in part to a positive indication that the article is an article hub.

33. The method of claim 25, wherein the trajectory data further indicate that the article is a web page acting as an article hub to which the user frequently returned as a source of links for other articles, wherein the user behavior data indicate a sum of time spent on individual articles linked to the article acting as the article hub, and wherein the ranking score is determined responsive at least in part to the sum of time.

34. The method of claim 25, wherein the ranking score for an article is an approximation of the importance of the article to the user relative to one or more other articles.

35. A computer system, for providing ranked articles, comprising:
- a processor for executing computer program instructions;
- a computer-readable storage medium having computer-executable program instructions embodied therein comprising:
  - an article locator for identifying one or more articles;
  - a client behavior data processor for receiving user behavior data associated with the one or more articles and determining trajectory data responsive at least in part to the user behavior data, wherein the trajectory data comprise an indication of whether an article of the one or more articles is a web page that started a user on a sequence of associated web pages; and
  - a ranking processor for determining a ranking score for each of the one or more articles based at least in part on the trajectory data, wherein the ranking score for the article is higher responsive at least in part to a positive indication that the article is a web page that started the user on a sequence of associated web pages, arranging the one or more articles in a ranking order responsive at least in part to the one or more ranking scores, and presenting the arranged one or more articles to a user in the ranking order.

36. The computer system of claim 35, wherein the one or more articles is comprised of one or more HTML files, XML files, XHTML files, PDF files, word processor files, database files, application document files, chat messages, email messages, audio files, or video files.

37. The computer system of claim 35, wherein the user behavior data indicate a number of times the user views the one or more articles.

38. The computer system of claim 35, wherein the user behavior data indicate an amount of time spent by the user viewing the one or more articles.

39. The computer system of claim 35, wherein the user behavior data indicate an amount of time elapsed since the one or more articles were last accessed by the user.

40. The computer system of claim 35, wherein the user behavior data indicate a time of day in which the one or more articles were accessed by the user.

41. The computer system of claim 35, wherein the user behavior data indicate a day of the week in which the one or more articles were accessed by the user.

42. The computer system of claim 35, wherein the trajectory data further indicate whether the article is a web page acting as an article hub to which the user frequently returned as a source of links for other articles and wherein the ranking score for the article is higher responsive at least in part to a positive indication that the article is an article hub.

43. The computer system of claim 42, wherein the trajectory data indicate that the article is a web page acting as an article hub to which the user frequently returned as a source of links for other articles, wherein the user behavior data indicate a sum of time spent on individual articles linked to the article acting as the article hub, and wherein the ranking score is determined responsive at least in part to the sum of time.

44. The computer system of claim 35, wherein the ranking score for an article is an approximation of the importance of the article to the user relative to one or more other articles.

45. A computer program product having a computer-readable storage medium having computer-executable program instructions embodied therein for providing ranked articles, comprising:
- a software portion configured to identify one or more articles;
- a software portion configured to receive user behavior data associated with the one or more articles;
- a software portion configured to determine trajectory data responsive at least in part to the user behavior data, wherein the trajectory data comprise an indication of whether an article of the one or more articles is a web page that started a user on a sequence of associated web pages;
- a software portion configured to determine a ranking score for each of the one or more articles based at least in part on the trajectory data, wherein the ranking score for the article is higher responsive at least in part to a positive indication that the article is a web page that started the user on a sequence of associated web pages;
- a software portion configured to arrange the one or more articles in a ranking order responsive at least in part to the one or more ranking scores; and
- a software portion configured to present the arranged one or more articles to a user in the ranking order.

46. The computer program product of claim 45, wherein the one or more articles is comprised of one or more HTML files, XML files, XHTML files, PDF files, word processor files, database files, application document files, chat messages, email messages, audio files, or video files.

47. The computer program product of claim 45, wherein the user behavior data indicate a number of times the user views the one or more articles.

48. The computer program product of claim 45, wherein the user behavior data indicate an amount of time spent by the user viewing the one or more articles.

49. The computer program product of claim 45, wherein the user behavior data indicate an amount of time elapsed since the one or more articles were last accessed by the user.

50. The computer program product of claim 45, wherein the user behavior data indicate a time of day in which the one or more articles were accessed by the user.

51. The computer program product of claim 45, wherein the user behavior data indicate a day of the week in which the one or more articles were accessed by the user.

52. The computer program product of claim 45, wherein the trajectory data indicate whether the article is a web page acting as an article hub to which the user frequently returned as a source of links for other articles and wherein the ranking score for the article is higher responsive at least in part to a positive indication that the article is an article hub.

53. The computer program product of claim 52, wherein the trajectory data indicate that the article is a web page acting as an article hub to which the user frequently returned as a source of links for other articles, wherein the user behavior data indicate a sum of time spent on individual articles linked to the article acting as the article hub, and wherein the ranking score is determined responsive at least in part to the sum of time.

54. The computer program product of claim 45, wherein the ranking score for an article is an approximation of the importance of the article to the user relative to one or more other articles.

* * * * *